United States Patent
Shuma et al.

(10) Patent No.: US 10,496,222 B2
(45) Date of Patent: Dec. 3, 2019

(54) GASKET WITH EMBEDDED CAPACITIVE SENSOR

(71) Applicant: Apple Inc., Cupertino, CA (US)

(72) Inventors: Richard D. Shuma, San Jose, CA (US); Kristen Carnohan, Palo Alto, CA (US)

(73) Assignee: Apple Inc., Cupertino, CA (US)

(*) Notice: Subject to any disclaimer, the term of this patent is extended or adjusted under 35 U.S.C. 154(b) by 0 days.

(21) Appl. No.: 16/143,402

(22) Filed: Sep. 26, 2018

(65) Prior Publication Data
US 2019/0025981 A1    Jan. 24, 2019

Related U.S. Application Data

(63) Continuation of application No. 15/272,105, filed on Sep. 21, 2016.

(51) Int. Cl.
| | |
|---|---|
| *G06F 3/044* | (2006.01) |
| *G06F 3/041* | (2006.01) |
| *G01L 1/14* | (2006.01) |
| *G06F 1/16* | (2006.01) |
| *G06F 3/0488* | (2013.01) |

(52) U.S. Cl.
CPC ............ *G06F 3/0416* (2013.01); *G01L 1/142* (2013.01); *G06F 1/16* (2013.01); *G06F 1/169* (2013.01); *G06F 3/044* (2013.01); *G06F 3/0414* (2013.01); *G06F 3/0445* (2019.05); *G06F 3/04142* (2019.05); *G06F 3/04883* (2013.01); *G06F 1/1656* (2013.01); *G06F 2203/04105* (2013.01)

(58) Field of Classification Search
None
See application file for complete search history.

(56) References Cited

U.S. PATENT DOCUMENTS

| | | |
|---|---|---|
| 3,993,939 A | 11/1976 | Slavin et al. |
| 5,483,261 A | 1/1996 | Yasutake |
| (Continued) | | |

FOREIGN PATENT DOCUMENTS

| | | |
|---|---|---|
| JP | 2000-163031 A | 6/2000 |
| JP | 2002-342033 A | 11/2002 |
| SU | 996878 A1 | 2/1983 |

OTHER PUBLICATIONS

Final Office Action dated Jul. 23, 2018, for U.S. Appl. No. 15/272,105, filed Sep. 21, 2016, five pages.

(Continued)

*Primary Examiner* — Brian M Butcher
(74) *Attorney, Agent, or Firm* — Brownstein Hyatt Farber Schreck, LLP

(57) ABSTRACT

An electronic device is disclosed. In some examples, the device includes one or more force sensors at its perimeter. The force sensors can be included in a gasket further comprising a rubber-like gasket cover and a compressible dielectric such as air or silicone, for example. A plurality of conductive plates can be embedded in the gasket cover with routing traces coupled thereto to sense a capacitance between the conductive plates. The gasket, including the one or more capacitive sensors, can be disposed between a cover glass and a lower housing of the electronic device. The capacitance of the one or more sensors can change in response to an applied force at the cover glass of the device. The change in capacitance can be sensed via the routing traces to measure the magnitude and, in some examples, location of the applied force.

18 Claims, 6 Drawing Sheets

(56) References Cited

U.S. PATENT DOCUMENTS

| | | |
|---|---|---|
| 5,488,204 A | 1/1996 | Mead et al. |
| 5,825,352 A | 10/1998 | Bisset et al. |
| 5,835,079 A | 11/1998 | Shieh |
| 5,854,625 A | 12/1998 | Frisch et al. |
| 5,880,411 A | 3/1999 | Gillespie et al. |
| 6,188,391 B1 | 2/2001 | Seely et al. |
| 6,310,610 B1 | 10/2001 | Beaton et al. |
| 6,323,846 B1 | 11/2001 | Westerman et al. |
| 6,450,972 B1 | 9/2002 | Knoll |
| 6,690,387 B2 | 2/2004 | Zimmerman et al. |
| 7,015,894 B2 | 3/2006 | Morohoshi |
| 7,184,064 B2 | 2/2007 | Zimmerman et al. |
| 7,663,607 B2 | 2/2010 | Hotelling et al. |
| 8,094,134 B2 | 1/2012 | Suzuki |
| 8,479,122 B2 | 7/2013 | Hotelling et al. |
| 8,698,777 B2 | 4/2014 | Endo |
| 2006/0197753 A1 | 9/2006 | Hotelling |
| 2010/0024573 A1 | 2/2010 | Daverman et al. |
| 2011/0187674 A1 | 8/2011 | Baker et al. |
| 2012/0098767 A1 | 4/2012 | Takai et al. |

OTHER PUBLICATIONS

Krutz, G et al. (2013). "Design and Evaluation of an Embedded Sensor in a Polymer Sealing Structure Smart Seal", *Proceedings of the ASME/BATH 2013 Symposium on Fluid Power & Motion Control*, Oct. 6-9, 2013, Sarasota, FL, six pages.

Lee, S.K. et al. (Apr. 1985). "A Multi-Touch Three Dimensional Touch-Sensitive Tablet," *Proceedings of CHI: ACM Conference on Human Factors in Computing Systems*, pp. 21-25.

Non-Final Office Action dated Jan. 11, 2018, for U.S. Appl. No. 15/272,105, filed Sep. 21, 2016, six pages.

Rubine, D.H. (Dec. 1991). "The Automatic Recognition of Gestures," CMU-CS-91-202, Submitted in Partial Fulfillment of the Requirements for the Degree of Doctor of Philosophy in Computer Science at Carnegie Mellon University, 285 pages.

Rubine, D.H. (May 1992). "Combining Gestures and Direct Manipulation," CHI '92, pp. 659-660.

Westerman, W. (Spring 1999). "Hand Tracking, Finger Identification, and Chordic Manipulation on a Multi-Touch Surface," A Dissertation Submitted to the Faculty of the University of Delaware in Partial Fulfillment of the Requirements for the Degree of Doctor of Philosophy in Electrical Engineering, 364 pages.

Non-Final Office Action dated Nov. 28, 2018, for U.S. Appl. No. 15/272,105, filed Sep. 21, 2016, twelve pages.

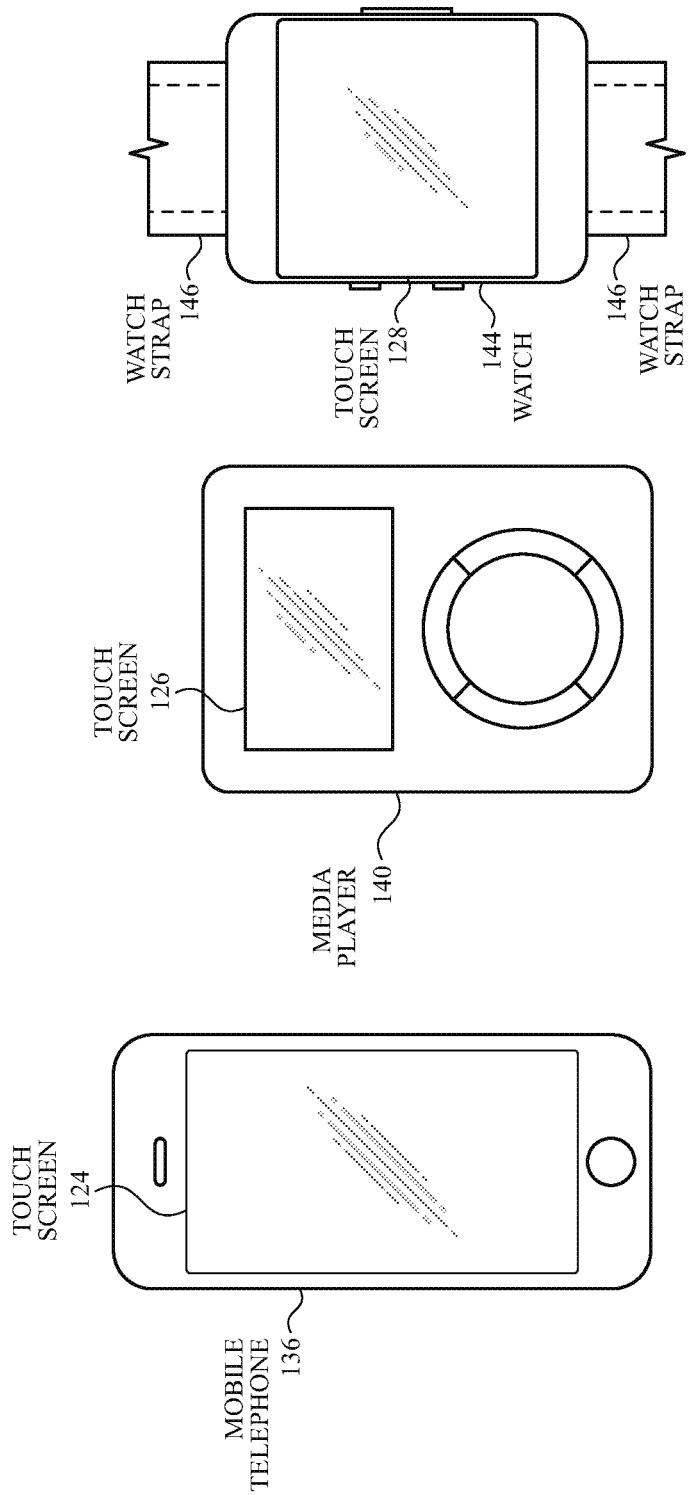

GASKET WITH EMBEDDED CAPACITIVE SENSOR

CROSS-REFERENCE TO RELATED APPLICATIONS

This application is a continuation of U.S. patent application Ser. No. 15/272,105 (now U.S. Publication No. 2018-0081485), filed Sep. 21, 2016, the entire disclosures of which are incorporated herein by reference for all purposes.

FIELD OF THE DISCLOSURE

This relates to a capacitive sensor included in an electronic device and, more particularly, to a capacitive sensor embedded in a gasket configured for detecting a force at the electronic device.

BACKGROUND OF THE DISCLOSURE

Many types of input devices are presently available for performing operations in a computing system, such as buttons or keys, mice, trackballs, joysticks, touch electrode panels, touch screens and the like. Touch screens, in particular, are becoming increasingly popular because of their ease and versatility of operation as well as their declining price. Touch screens can include a touch electrode panel, which can be a clear panel with a touch-sensitive surface, and a display device such as a liquid crystal display (LCD) that can be positioned partially or fully behind the panel so that the touch-sensitive surface can cover at least a portion of the viewable area of the display device. Touch screens can allow a user to perform various functions by touching the touch electrode panel using a finger, stylus or other object at a location often dictated by a user interface (UI) being displayed by the display device. In general, touch screens can recognize a touch and the position of the touch on the touch electrode panel, and the computing system can then interpret the touch in accordance with the display appearing at the time of the touch, and thereafter can perform one or more actions based on the touch. In the case of some touch sensing systems, a physical touch on the display is not needed to detect a touch. For example, in some capacitive-type touch sensing systems, fringing electrical fields used to detect touch can extend beyond the surface of the display, and objects approaching near the surface may be detected near the surface without actually touching the surface.

In some examples, touch panels/touch screens may include force sensing capabilities—that is, they may be able to detect an amount of force with which an object is touching the touch panels/touch screens. These forces can constitute force inputs to electronic devices for performing various functions, for example. In some examples, an electronic device can include one or more force sensors around the perimeter of a touch screen.

SUMMARY

The present disclosure relates to a dielectric-filled gasket with a capacitive sensor. In some examples, the gasket can be included in an electronic device further comprising a cover glass and a lower housing. The cover glass can be attached to the lower housing via a clamp mechanism, for example. In some examples, the lower housing can include a groove around its interior perimeter in which the gasket can sit, forming a seal. The gasket can include one or more pairs of parallel conductive plates encased in a rubber-like material, the rubber-like material surrounding a dielectric such as air or silicone, for example. In some examples, the gasket can further include routing traces coupled to the parallel conductive plates to sense a change in capacitance caused by a force applied to the cover glass of the device. A pair of conductive plates can be used to determine a magnitude of an applied force, for example. In some examples, the gasket can include multiple pairs of parallel conductive plates so as to determine a location of an applied force in addition to its magnitude (e.g., one sensor pair corresponding to each corner of a device).

BRIEF DESCRIPTION OF THE DRAWINGS

FIGS. 1A-1C illustrate exemplary devices that can include one or more force sensors according to examples of the disclosure.

DETAILED DESCRIPTION

Figure 2A:
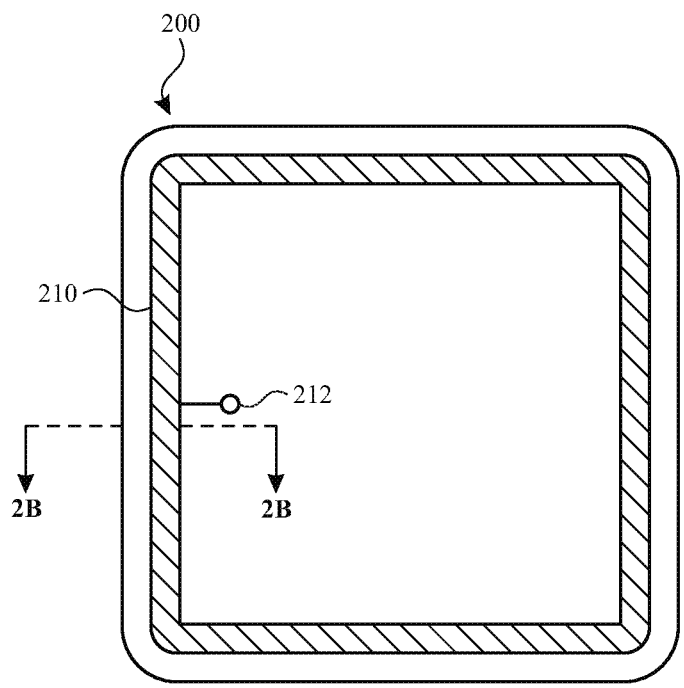
FIG. 2A illustrates a top view of an exemplary device including a force sensor at its perimeter according to examples of the disclosure.

In the following description of examples, reference is made to the accompanying drawings which form a part hereof, and in which it is shown by way of illustration specific examples that can be practiced. It is to be understood that other examples can be used and structural changes can be made without departing from the scope of the disclosed examples.

The present disclosure relates to a dielectric-filled gasket with a capacitive sensor. In some examples, the gasket can be included in an electronic device further comprising a cover glass and a lower housing. The cover glass can be attached to the lower housing via a clamp mechanism, for example. In some examples, the lower housing can include a groove around its interior perimeter in which the gasket can sit, forming a seal. The gasket can include one or more pairs of parallel conductive plates encased in a rubber-like material, the rubber-like material surrounding a dielectric such as air or silicone, for example. In some examples, the gasket can further include routing traces coupled to the parallel conductive plates to sense a change in capacitance caused by a force applied to the cover glass of the device. A pair of conductive plates can be used to determine a magnitude of an applied force, for example. In some examples, the gasket can include multiple pairs of parallel conductive plates so as to determine a location of an applied force in addition to its magnitude (e.g., one sensor pair corresponding to each corner of a device).

FIGS. 1A-1C illustrate exemplary devices that can include one or more force sensors according to examples of the disclosure. FIG. 1A illustrates an example mobile telephone 136 that includes a touch screen 124. FIG. 1B illustrates an example digital media player 140 that includes a touch screen 126. FIG. 1C illustrates an example watch 144 that includes a touch screen 128. It is understood that the above touch screens can be implemented in other devices as well, such as tablet computers or other wearable devices. Further, though the examples of the disclosure are provided in the context of a touch screen, it is understood that the examples of the disclosure can similarly be implemented in a touch sensor panel without display functionality.

In some examples, touch screens 124, 126 and 128 can be based on self-capacitance. A self-capacitance based touch system can include a matrix of small, individual plates of conductive material that can be referred to as touch node electrodes. For example, a touch screen can include a plurality of individual touch node electrodes, each touch node electrode identifying or representing a unique location on the touch screen at which touch or proximity (i.e., a touch or proximity event) is to be sensed, and each touch node electrode being electrically isolated from the other touch node electrodes in the touch screen. Such a touch screen can be referred to as a pixelated self-capacitance touch screen, though it is understood that in some examples, the touch node electrodes on the touch screen can be used to perform scans other than self-capacitance scans on the touch screen (e.g., mutual capacitance scans). During operation, a touch node electrode can be stimulated with an AC waveform, and the self-capacitance to ground of the touch node electrode can be measured. As an object approaches the touch node electrode, the self-capacitance to ground of the touch node electrode can change. This change in the self-capacitance of the touch node electrode can be detected and measured by the touch sensing system to determine the positions of multiple objects when they touch, or come in proximity to, the touch screen. In some examples, the electrodes of a self-capacitance based touch system can be formed from rows and columns of conductive material, and changes in the self-capacitance to ground of the rows and columns can be detected, similar to above. In some examples, a touch screen can be multi-touch, single touch, projection scan, full-imaging multi-touch, capacitive touch, etc.

In some examples, touch screens 124, 126 and 128 can be based on mutual capacitance. A mutual capacitance based touch system can include drive and sense lines that may cross over each other on different layers, or may be adjacent to each other on the same layer. The crossing or adjacent locations can be referred to as touch nodes. During operation, the drive line can be stimulated with an AC waveform and the mutual capacitance of the touch node can be measured. As an object approaches the touch node, the mutual capacitance of the touch node can change. This change in the mutual capacitance of the touch node can be detected and measured by the touch sensing system to determine the positions of multiple objects when they touch, or come in proximity to, the touch screen.

In some examples, a device of the disclosure can include force sensing capability in addition to the touch sensing capability discussed above. In the context of this disclosure, touch sensing can refer to the touch screen's ability to determine the existence and/or location of an object touching the touch screen, and force sensing can refer to the touch screen's ability to determine a "depth" of the touch on the touch screen (e.g., the degree of force with which the object is touching the touch screen). In some examples, the touch screen can also determine a location of the force on the touch screen.

FIG. 2A illustrates a top view of an exemplary device 200 including a force sensor 210 at its perimeter according to examples of the disclosure. In some examples, the force sensor 210 can be one continuous sensor around the perimeter of the device 200. The force sensor 210 can include a connection 212 that can be operatively coupled to a processor (not shown) of the device 200, for example. In some examples, the force sensor 210 can include multiple force sensors electrically isolated from each other, wherein each force sensor has a connection operatively coupled to the processor. A cross-section of device 200 is illustrated in FIG. 2B.

Figure 2B:
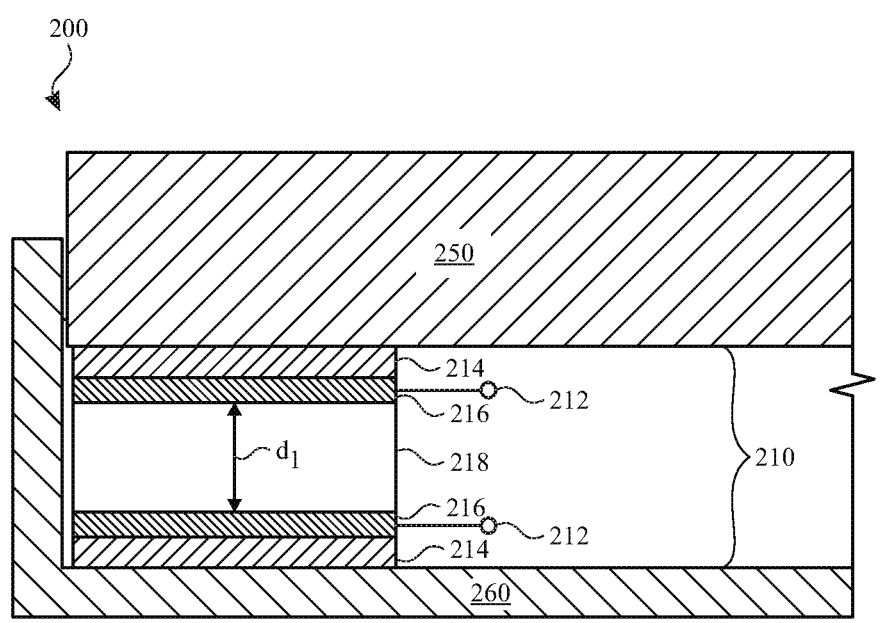
FIG. 2B illustrates a cross-section of a device including a force sensor according to examples of the disclosure.

FIG. 2B illustrates a cross-section of a device 200 including a force sensor 210 according to examples of the disclosure. In some examples, the device 200 can include a cover glass 250 (which can alternatively made of other materials such as plastic), a device housing 260, and a force sensor 210 disposed therebetween. The force sensor 210 can include pressure-sensitive adhesive (PSA) 214, conductive plates 216, connections 212, and a compressible dielectric 218. In some examples, the conductive plates 216 can be disposed at a distance d1 from one another and each can be coupled to a connection 212. Conductive plates 216 can be situated normal to an applied force at the cover glass 250 of device 200. Additionally or alternatively, in some examples, conductive plates 216 can be situated in a different orientation to sense an applied force at a different location (e.g. a force applied at the edges of device 200).

In some examples, conductive plates 216 can function as a parallel-plate capacitor. When no force is applied to the cover glass 250 of the device 200, the conductive plates can be a nominal distance d1 from each other. When a force is applied to cover glass 250, the distance d1 between the conductive plates 216 can change. In some examples, a change in distance d1 between the conductive plates 216 can cause the capacitance of the plates to change. The capacitance of the conductive plates 216 can be measured via connections 212, for example. In some examples, the capacitance can be measured by applying a first signal (e.g., an AC signal) to one of the conductive plates 214 and measuring a second signal at the other conductive plate. In some examples, the PSA 214 and compressible dielectric 218 can be made of compressible materials that yield under an applied force, allowing for distance d1 to change in response to an applied force. Therefore, by sampling, via connections 212, the capacitance of pressure sensor 210, a magnitude of force at the cover glass 250 can be determined.

In some examples, a location of an applied force can be determined based on touch data provided by a touch sensor, such as a touch screen (e.g., touch screen 124, 126, or 128) further included in device 200. In some examples, multiple force sensors 210 can be included along the perimeter of device 200. By determining the magnitude of force sensed by each of a plurality of force sensors, a centroid of one or more applied forces can be determined.

In some examples, the cover glass 250 and device housing 260 can be held together by PSA 214 included in the force sensor 210. By including a force sensor 210 around the perimeter of device 200, the PSA 214 can protect the internal electronics (not shown) of the device from liquids and particles outside of the device.

Although the exemplary force sensor 210 described with reference to FIGS. 2A-2B can measure force and provide PSA 214 to hold device 200 together, over time, the PSA can weaken from exposure to chemicals and/or sheer forces. Eventually, device 200 can lose its waterproof properties or cover glass 250 can be come displaced as PSA 214 weakens. Further, to access the internal electronics (not shown) of device 200 for troubleshooting or maintenance purposes, the cover glass 250 must be removed, which can destroy the pressure sensor 210. Therefore, installation of a new pressure sensor can be required in addition to any other maintenance to be performed on the device. Therefore, in some examples, it can be advantageous to hold the device 200 together without the use of PSA and include a pressure sensor that can function as a gasket to seal the inside of the device.

Figure 3A:
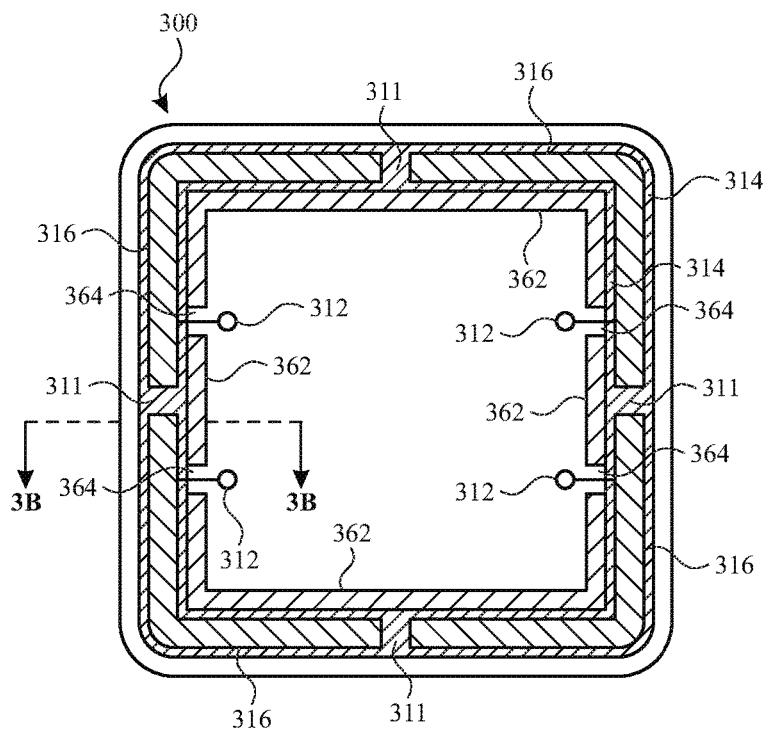
FIG. 3A illustrates a top view of an exemplary device including a plurality force sensors, each including conductive plates, at its perimeter according to examples of the disclosure.

FIG. 3A illustrates a top view of an exemplary device 300 including a plurality force sensors, each including conductive plates 316, at its perimeter according to examples of the disclosure. In some examples, the conductive plates 316 can be included in a gasket, which can further include gasket cover 314, disposed along the perimeter of the device 300. Gasket cover 314 can be made of a flexible and/or compressible material, such as rubber or plastic, for example. In some examples, each conductive plate 316 can be coupled to a connection 312 that can be further operatively coupled to a processor of the device 300. The gasket including the conductive plates 316 can seal the perimeter of the device 300, for example. In some examples, the conductive plates 314 can be electrically isolated from one another by gaps 311. The gaps 311 can be filled with the gasket cover 314 material, thereby forming a complete gasket around the perimeter of the device 300. Therefore, in some examples, the gasket can be rectangle-shaped to conform to the shape of the device 300. Other shapes, such as circles, ovals, or squares, for example, are possible. In some examples, a different material can be used to fill gaps 311. Alternatively, in some examples, the device 300 can include one force sensor along its full perimeter. Device 300 can further include a channel 362 to hold the gasket including the conductive plates 316 in place, for example. In some examples, the channel 362 can include gaps 364 to allow the connections 312 to be coupled to internal electronics of the device 300. Although FIG. 3A illustrates the conductive plates 316 as being placed at the corners of device 300, in some examples, different placement of the conductive plates 316 is possible. Furthermore, although device 300 can have four pairs of conductive plates 316; other numbers of conductive plates are possible. A cross-section of device 300 is illustrated in FIG. 3B.

Figure 3B:
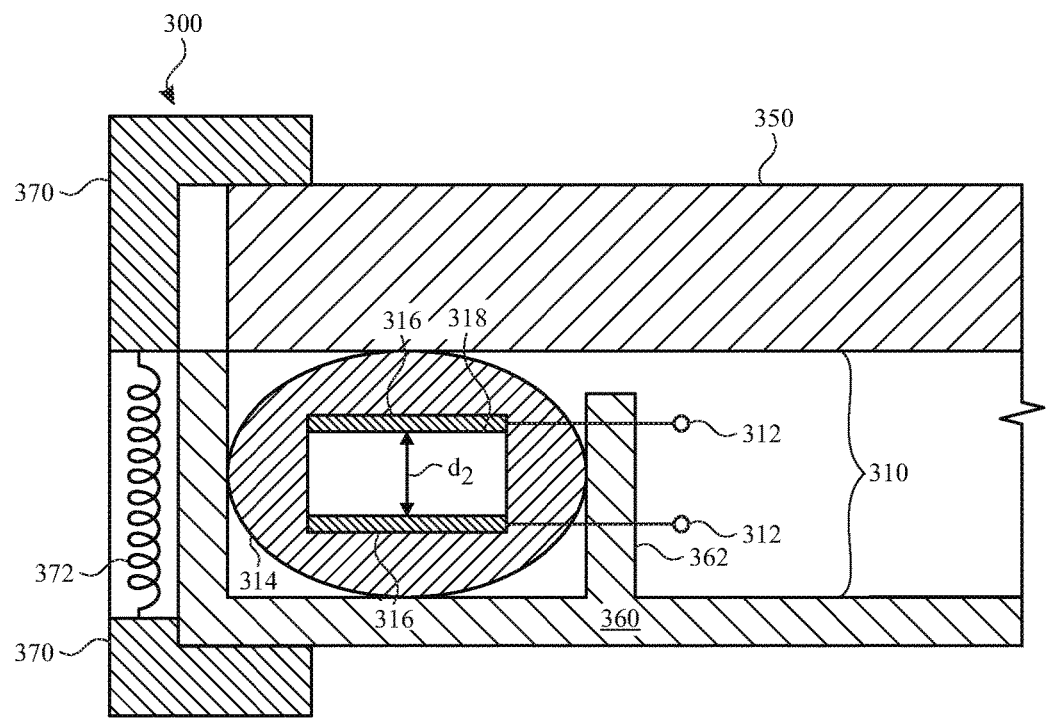
FIG. 3B illustrates a cross-section of a device including a force sensor according to examples of the disclosure.

FIG. 3B illustrates a cross-section of a device 300 including a force sensor 310 according to examples of the disclosure. In some examples, force sensor 310 can be one of a plurality of force sensors included in device 300. The device 300 can include a cover glass 350 (or other cover material), a device housing 360, and a force sensor 310 disposed therebetween, for example. The device 300 can be held together by clamp 370, which can apply a nominal compressive force represented by spring 372. Clamp 370 can include a spring like mechanism other than spring 372 in some examples. The force sensor 310 can include gasket cover 314 (e.g., a rubber-like insulative coating), conductive plates 316, connections 312, and a compressible dielectric 318. In some examples, the conductive plates 316 can be disposed at a distance d2 from one another and each be coupled to a connection 312. Conductive plates 316 can be situated normal to an applied force at the cover glass 350 of device 300. Additionally or alternatively, in some examples, conductive plates 316 can be situated in a different orientation to sense an applied force at a different location (e.g. a force applied at the edges of device 300).

In some examples, the gasket including the force sensors 310 can be manufactured using an over-molding technique. One or more sensors 310 including conductive plates 316, compressible dielectric 318, and connections 312 can be provided. The one or more sensors 310 can be arranged in a shape of the perimeter of device 300, and the gasket cover 314 can be over-molded to cover the one or more sensors. In some examples, the gasket can include a single force sensor 310 formed in the shape of the perimeter of device 300. Over-molding can include providing sensors 310 in a mold having the shape of the gasket and filling the mold with the gasket cover 314 material, thus applying the gasket cover around the sensors, for example. Additionally or alternatively, the gasket cover 314 material can be applied to the arranged sensors 310 with a different technique, such as dipping the sensors in the gasket cover material or brushing or spraying the gasket material onto the sensors. Once formed, the gasket can be inserted into the channel 362 of the device housing 360 and the rest of the device 300 can be assembled. In some examples, the resulting cross-section of the gasket can have an oval shape. Depending on how the gasket cover material is applied, other cross-sectional shapes, such as circles, squares, or rectangles, for example, are possible.

Once the device 300 is assembled with the force sensors 310 in the correct position, conductive plates 316 can function as a parallel-plate capacitor. When no force is applied to the cover glass 350 of the device 300, the conductive plates can be a nominal distance d2 from each other. A capacitance of the conductive plates 316 can be measured via connections 312. In some examples, a capacitance can be measured by applying a first signal to one of the conductive plates 316 and measuring a second signal at the other conductive plate. In some examples, the gasket cover 314 and compressible dielectric 318 can be made of compressible materials that yield under an applied force. The gasket cover 314 and compressible dielectric 318 can be made of a same material or of different materials. When a force is applied to cover glass 350, the distance d2 between the conductive plates 316 can change. In some examples, a change in distance d2 between the conductive plates 316 can cause the capacitance of the plates to change. Therefore, by sampling the capacitance of pressure sensor 310 via connections 312, a magnitude of force at the cover glass 350 can be determined. In some examples, it can be advantageous to include a flexible, but not compressible gasket cover 314 and a compressible dielectric 318 to increase a change in distance d2 between conductive plates 316 in response to an applied force.

In some examples, a location of one or more applied forces can be determined based on the relative forces measured at each of the plurality of force sensors 310. Additionally or alternatively, touch data provided by a touch sensor, such as a touch screen (e.g., touch screen 124, 126, or 128) further included in device 300 can be used to determine the location of the one or more applied forces.

In some examples, the cover glass 350 and device housing 360 can be held together by clamp 370. Clamp 370 can include a spring 372 (or other similar mechanism) to apply a nominal compressive force between the cover glass 350 and the device housing 360. It should be understood that clamp 370 is exemplary and other coupling means may be used. For example, a clamp can be interior to the device and/or may include a different mechanism to apply a nominal compressive force to join cover glass 350 and device housing 360. Spring 372 and compressible dielectric 318 can be selected such that the nominal force required to hold device 300 together can be overcome by a force applied by a user of the device. When selecting compressible dielectric 318, a tradeoff can be made between providing a low nominal force and increased responsiveness with a soft dielectric versus increased durability with a firm dielectric. Because clamp 370 can apply a nominal force, a minimum measurable force can be limited by the clamp. That is, forces that are a lower magnitude than the nominal force may not be sensed. In some examples, a maximum measurable force can be limited by a height of channel 362. This maximum measurable force can simplify calibration by providing an upper limit on a measurable applied force. Further, channel 362 can limit the displacement of cover glass 350, protecting the internal electronics of device 300. Channel 362 can hold the gasket including the sensor 310 in place. By including the gasket, including sensors 310, around the full perimeter of device 300, the gasket can provide a seal to protect the internal electronics (not shown) of the device from liquids and particles outside of the device.

By providing the clamp 370 to hold device 300 together and the gasket including pressure sensors 310 as a seal, the device can have increased durability compared to a device (e.g., device 200) held together by PSA (e.g., PSA 214). For example, device 300 can be chemically resistant. Furthermore, the pressure sensors 310 can be reused if cover glass 350 is removed to perform troubleshooting or maintenance on the internal electronics of the device 300. To access the internal electronics of the device 300, clamp 370 and cover glass 350 can be removed. To reassemble the device, clamp 370 and cover glass 350 can be reassembled without damaging sensor 310. In some examples, after reassembly, sensor 310 can be recalibrated to account for any change in the nominal force applied by the clamp 370.

Figure 4A:
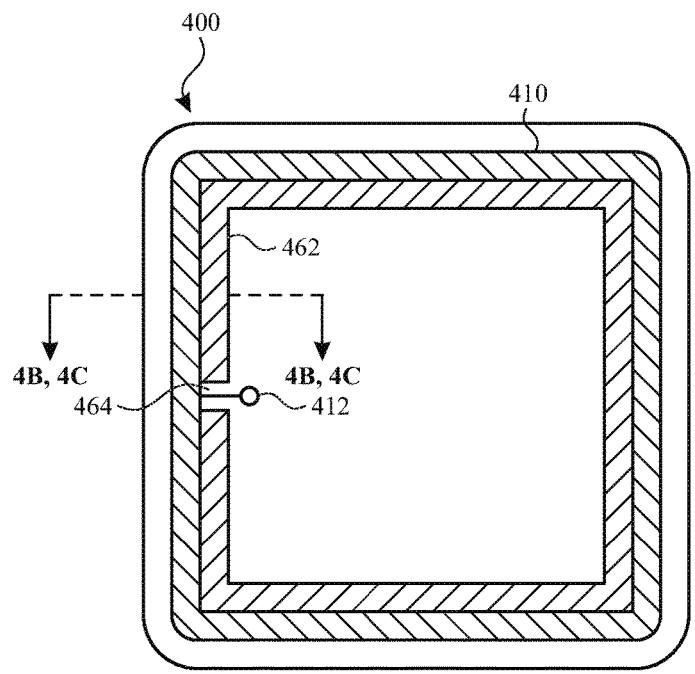
FIG. 4A illustrates a top view of an exemplary device including a force sensor at its perimeter according to examples of the disclosure.

FIG. 4A illustrates a top view of an exemplary device 400 including a force sensor 410 at its perimeter according to examples of the disclosure. In some examples, the force sensor 410 can be disposed along the perimeter of the device 400. The force sensor 410 can include a connection 412 that can be operatively coupled to a processor of the device 400, for example. The force sensor 410 can function as a gasket to seal the perimeter of the device 400, for example. Therefore, in some examples, the gasket can be rectangle-shaped to conform to the shape of the device 400. In some examples, other shapes, such as squares, circles, or ovals, for examples, are possible. Device 400 can further include a channel 462 to hold the gasket including the pressure sensor 410 in place, for example. In some examples, the channel 462 can include a gap 464 to allow the connection 412 to be coupled to internal electronics of the device 300. Although device 400 is shown as including a single force sensor 410 along its perimeter, in some examples, multiple electrically isolated force sensors, each with connections couplable to a processor, are possible. Cross-sectional views of device 400 are illustrated in FIGS. 4B-4C.

Figure 4B:
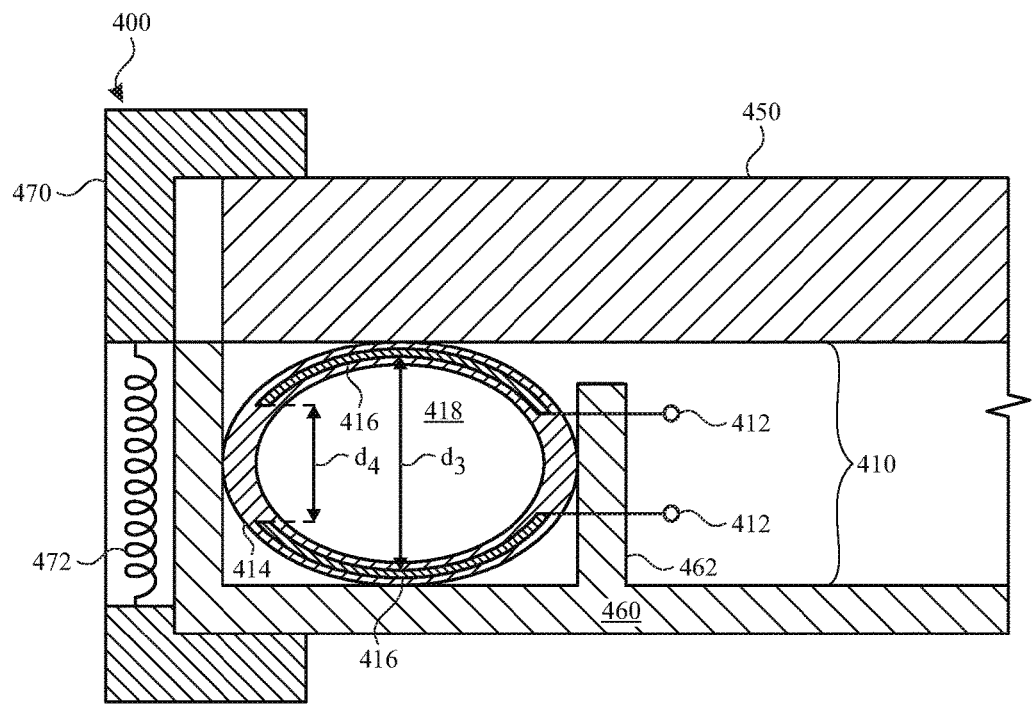
FIGS. 4B-4C illustrate cross-sectional views of an exemplary device including a force sensor according to examples of the disclosure.
Figure 4C:
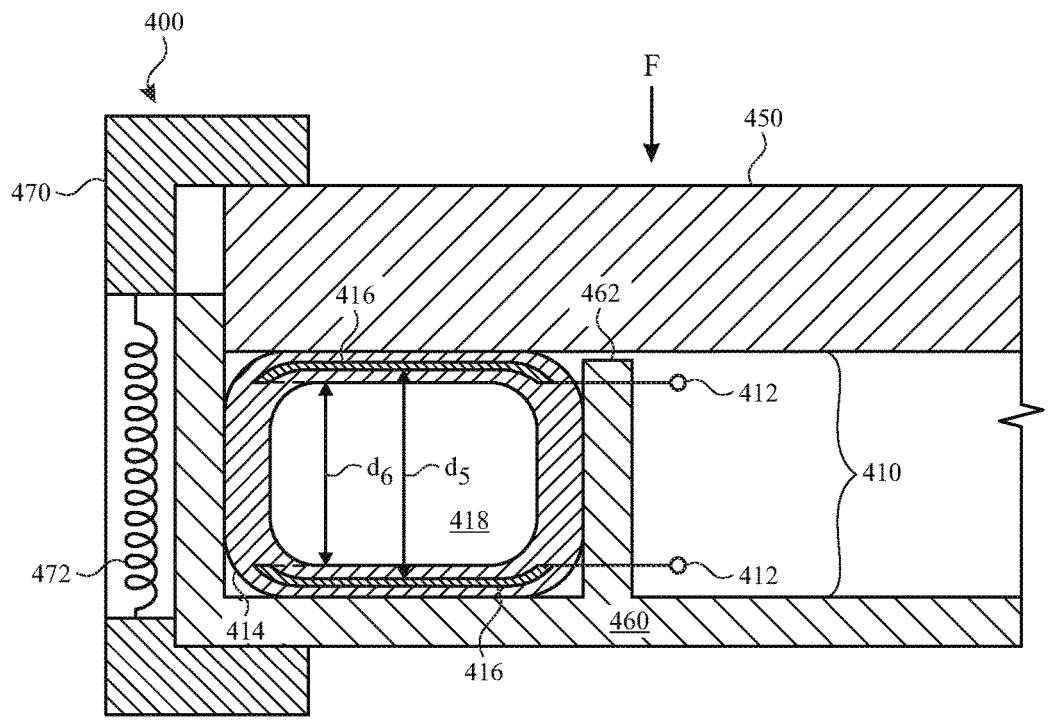

FIGS. 4B-4C illustrate cross-sectional views of an exemplary device 400 including a force sensor 410 according to examples of the disclosure. In some examples, force sensor 410 can be one of a plurality of force sensors included in device 400. The device 400 can include a cover glass 450 (or other cover material), a device housing 460, and a force sensor 410 disposed therebetween, for example. The device 400 can be held together by a clamp 470 configured to apply a nominal compressive force to the device. In some examples, this compressive force can be modeled by a spring 472. The force sensor 410 can include gasket cover 414, conductive plates 416, connections 412, and a compressible dielectric 418. The compressible dielectric 418 can be non-structural, for example. In some examples, air can be used as the compressible dielectric 418, thus allowing for a hollow gasket. Conductive plates 416 can be situated normal to an applied force at the cover glass 450 of device 400. Additionally or alternatively, in some examples, conductive plates 416 can be situated in a different orientation to sense an applied force at a different location (e.g. a force applied at the edges of device 400).

In some examples, the gasket can be manufactured using an extrusion technique. One or more extrusion molds can be provided to shape the conductive plates 416, flexible dielectric 418, and gasket cover 414 into an elongated shape with a desired cross-sectional structure. Although the cross section of the gasket illustrated in FIG. 4B can be oval-shaped, other cross-sectional shapes, such as squares, rectangles, or circles, for example, are possible, depending on the shape of the extrusion molds used. The resulting elongated capacitor can be shaped to fit the perimeter of device 400, thus forming the gasket including the pressure sensor 410, as described above. Extrusion molding can allow the gasket to be formed using a non-structural dielectric, for example. For example, extrusion molding can be used to form a hollow gasket, allowing air to function as the compressible dielectric 418. Once formed, the gasket can be inserted into the channel 462 of the device housing 460 and the rest of the device 400 can be assembled.

Once the device 400 is assembled, including the pressure sensor 410, conductive plates 416 can function as a parallel-plate capacitor. The conductive plates 416 can be disposed such that, when no force is present, their centers are a distance d3 from each other and their edges are a distance d4 from each other, due to their curvature, as shown in FIG. 4B. In the presence of a force F, the conductive plates can move closer together and their curvature can decrease. For example, the centers of the conductive plates 416 can be a distance d5 from each other and the edges can be a distance d6 from each other, as shown in FIG. 4C. In some examples, these changes in distance between the conductive plates 416 can cause a capacitance of the plates to change. The capacitance of the conductive plates 416 can be measured via connections 412, for example. In some examples, a capacitance can be measured by applying a first signal to one of the conductive plates 416 and measuring a second signal at the other conductive plate. In some examples, the gasket cover 414 and compressible dielectric 418 can be made of compressible materials that yield under an applied force. In some examples, air can be used as the compressible dielectric 418, allowing the gasket to be hollow. Therefore, by sampling the capacitance of pressure sensor 410 via connections 412, a magnitude of force at the cover glass 450 can be determined.

In some examples, a location of one or more applied forces can be determined based on touch data provided by a touch sensor, such as a touch screen (e.g., touch screen 124, 126 or 128) further included in device 400. That is, it can be assumed that a centroid of touch is also a centroid of an applied force, for example. In some examples including multiple pressure sensors, the relative forces measured at each of the plurality of force sensors can be weighed to determine force location in addition to or as an alternative to using touch data to determine force location.

In some examples, the cover glass 450 and device housing 360 can be held together by a clamp 470. Clamp 470 can include a spring 472 (or similar mechanism) to apply a nominal compressive force between the cover glass 450 and the device housing 460. It should be understood that clamp 470 is exemplary and other coupling means may be used. For example, a clamp or other coupling means can be interior to the device and/or may include a different mechanism to apply a nominal compressive force to join cover glass 450 and device housing 460. Spring 472 and compressible dielectric 418 can be selected such that the nominal force required to hold device 400 together can be readily overcome by a force applied by a user of the device. When selecting compressible dielectric 418, a tradeoff can be made between providing a low nominal force and increased responsiveness by using a soft dielectric versus increased durability provided by using a firm dielectric. In some examples, it can be advantageous to use air or another non-structural dielectric material as the compressible dielectric 418 because it is both soft and robust. For example, air can be repeatedly compressed by applied forces over time without deforming or otherwise deteriorating. Because clamp 470 can apply a nominal compressive force, a minimum detectable force can be set by the clamp. That is, an applied force with a magnitude less than the nominal compressive force may not be sensed. In some examples, a maximum measurable force can be limited by a height of channel 462. This maximum measurable force can simplify calibration by providing an upper limit on a measurable applied force. Further, channel 462 can limit the displacement of cover glass 450, protecting the internal electronics of device 400. Channel 462 can hold the gasket including the sensor 410 in place. By including the gasket around the full perimeter of device 400, the gasket can provide a seal to protect the internal electronics (not shown) of the device from liquids and particles outside of the device.

By providing the clamp 470 to hold device 400 together and the gasket including pressure sensors 410 as a seal, the device can have increased durability compared to a device (e.g., device 200) held together by PSA (e.g., PSA 214). For example, device 400 can be chemically resistant. Furthermore, the pressure sensors 410 can be reused if cover glass 450 is removed to perform maintenance or troubleshooting on the internal electronics of the device 400. To access the internal electronics of the device 400, clamp 470 and cover glass 450 can be removed. To re-assemble the device, clamp 470 and cover glass 450 can be re-assembled without damaging sensor 410. In some examples, after re-assembly, sensor 410 can be recalibrated to account for any change in nominal force applied by clamp 470. Further, in some examples, air or a different non-structural dialectic material can be used as compressible dielectric 418. In some examples, air can be both soft and robust, allowing for a low nominal force, relatively increased force sensor 410 responsiveness, and sensor durability, as described above.

Figure 5:
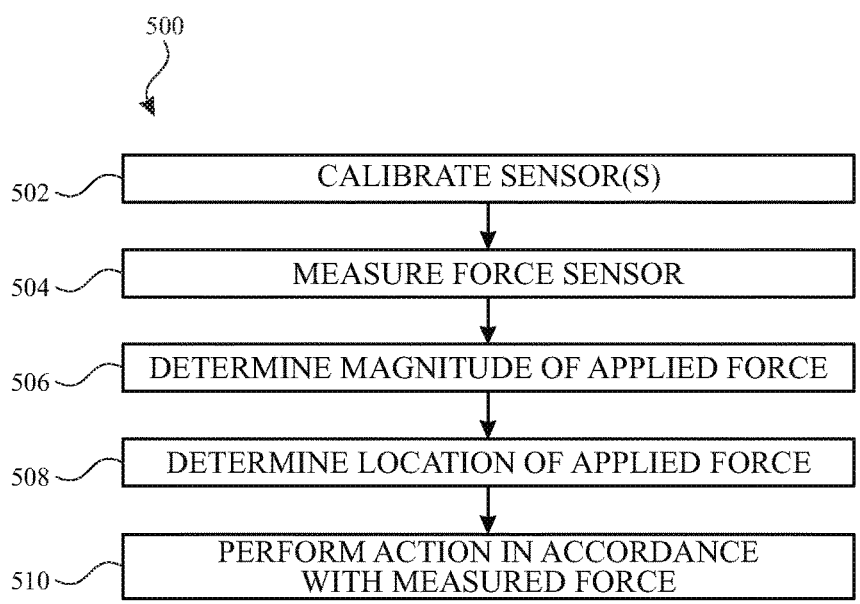
FIG. 5 illustrates an exemplary method for measuring an applied force at an electronic device according to examples of the disclosure.

FIG. 5 illustrates an exemplary method 500 for measuring an applied force at an electronic device according to examples of the disclosure. Method 500 can be performed by an electronic device according to the exampled described above with reference to FIGS. 1-4.

In some examples, the method 500 can include calibrating 502 the one or more force sensors (e.g., force sensors 210, 310 or 410) included in the electronic device. Calibration can be performed at the manufacturing facility and/or using specialized equipment. For example, a series of forces of known magnitudes and locations can be applied to the electronic device. The corresponding capacitive response of the one or more force sensors can be measured and associated with the known applied force to create a model of the one or more force sensors. The model can be a lookup table (LUT) or a function, for example, and can be stored in a memory of the electronic device.

While the device is operating, the one or more force sensors (e.g., force sensors 210, 310 or 410) can be measured 504. In some examples, measuring a force sensor can include measuring a capacitance of a force sensor including conductive plates (e.g., conductive plates 216, 316 or 416). For example, the one or more force sensors can include two conductive plates, forming a parallel plate capacitor. To measure the capacitance of a force sensor including a parallel plate capacitor, a first conductive plate can receive a first signal and a second signal of a second plate can be measured (e.g., via connections 212, 312 or 412). The capacitance can be determined based on the measured signal of the second plate. In some examples, the one or more sensors can have a different number of conductive plates. Other types of force sensors are possible.

In some examples, a magnitude of an applied force can be determined 506 based on the measurement of the force sensor. In some examples, determining the magnitude of the applied force can include applying a model (e.g., a LUT or a function) to the one or more measured force sensors. The model can be obtained during a calibration procedure, such as calibration 502, for example. In some examples, determining a magnitude of force can include combining the measurements from a plurality of force sensors included in a device (e.g., plurality of force sensors 310 included in device 300).

In some examples, a location of force can also be determined 508. Determining a location of force can occur before, after, or at a same time as determining a magnitude of applied force. In some examples, determining a location of force can include weighing the measurements of a plurality of force sensors (e.g., plurality of force sensors 310), each at a unique location on the electronic device. Additionally or alternatively, determining a location of force can include analyzing touch data from a touch sensor further included in the electronic device. For example, in a device including only one force sensor (e.g., device 200 or 400, having sensor 210 or 410, respectively), the location of force can be a location of an object touching the touch screen of a device. In some examples, touch data can be used in conjunction with force data from a plurality of force sensors for a more accurate determination of a force location.

In response to a detected force, the electronic device can perform 510 an associated action. For example, the applied force can be user input for a secondary touch action (e.g., right click). In some examples, an action to be performed in response to an applied force can vary depending on which application is running on the electronic device. An applied force can be processed as user input along with other input modalities such as touch screen input, keyboard input, and/or voice control, to name a few examples.

Figure 6:
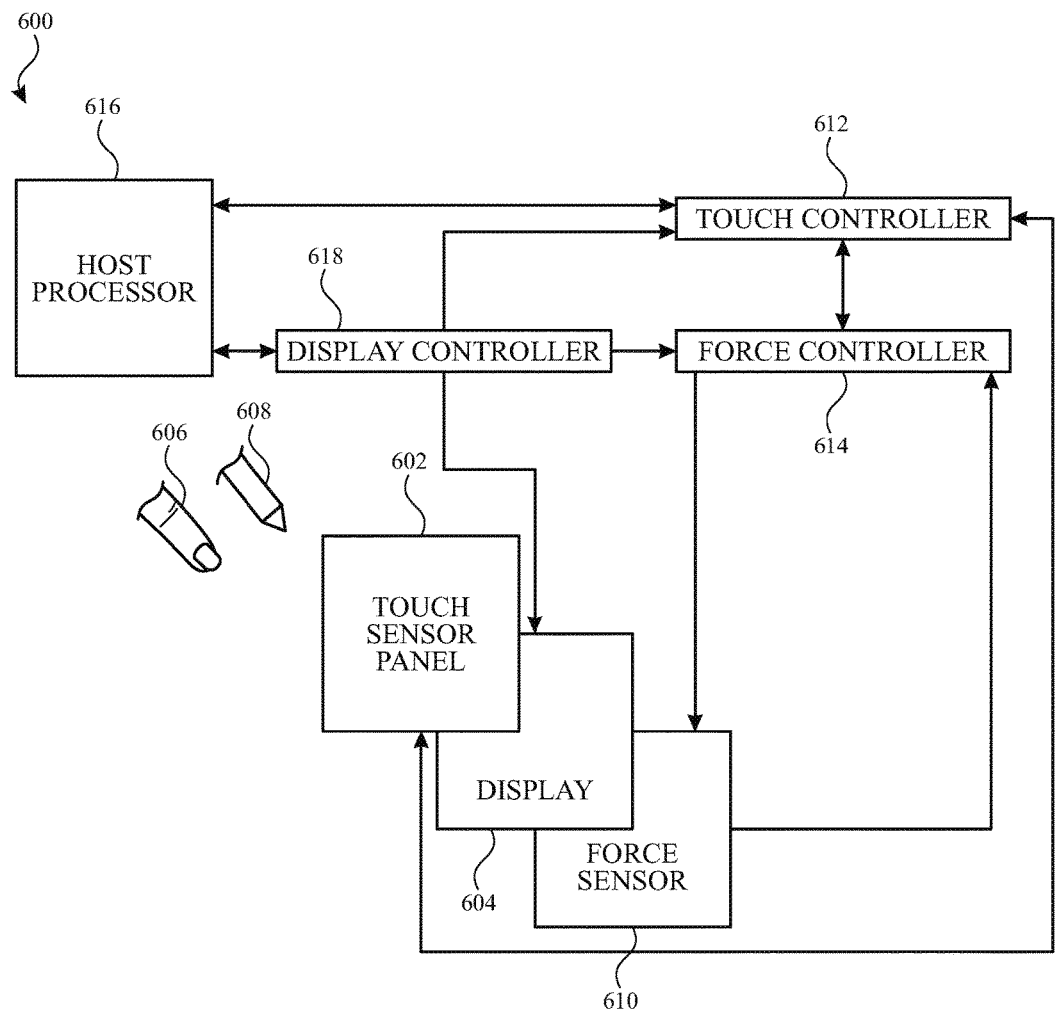
FIG. 6 illustrates exemplary computing system capable of implementing force sensing according to examples of the disclosure.

FIG. 6 illustrates exemplary computing system 600 capable of implementing force sensing according to examples of the disclosure. Computing system 600 can include a touch sensor panel 602 to detect touch or proximity (e.g., hover) events from a finger 606 or stylus 608 at a device, such as a mobile phone, tablet, touchpad, portable or desktop computer, portable media player, wearable device or the like. Touch sensor panel 602 can include a pattern of electrodes to implement various touch and/or stylus sensing scans. The pattern of electrodes can be formed of a transparent conductive medium such as Indium Tin Oxide (ITO) or Antimony Tin Oxide (ATO), although other transparent and non-transparent materials, such as copper, can also be used. For example, the touch sensor panel 602 can include an array of touch nodes that can be formed by a two-layer electrode structure (e.g., row and column electrodes) separated by a dielectric material, although in other examples the electrodes can be formed on the same layer. Touch sensor panel 602 can be based on self-capacitance or mutual capacitance or both, as previously described.

In addition to touch sensor panel 602, computing system 600 can include display 604 and force sensor circuitry 610 (e.g., including force sensor 210, 310 or 410) to create a touch and force sensitive display screen. Display 604 can use liquid crystal display (LCD) technology, light emitting polymer display (LPD) technology, organic LED (OLED) technology, or organic electro luminescence (OEL) technology, although other display technologies can be used in other examples. In some examples, the touch sensor panel 602, display 604 and/or force sensor circuitry 610 can be stacked on top of one another. For example, touch sensor panel 602 can cover a portion or substantially all of a surface of display 604. In other examples, the touch sensor panel 602, display 604 and/or force sensor circuitry 610 can be partially or wholly integrated with one another (e.g., share electronic components, such as in an in-cell touch screen).

Computing system 600 can include one or more processors, which can execute software or firmware implementing and synchronizing display functions and various touch, stylus and/or force sensing functions according to examples of the disclosure. The one or more processors can include a touch processor in touch controller 612, a force processor in force controller 614 and a host processor 616. Force controller 614 can implement force sensing operations, for example, by controlling force sensor circuitry 610 (e.g., stimulating one or more electrodes of the force sensor circuitry 610) and receiving force sensing data (e.g., mutual capacitance information) from the force sensor circuitry 610 (e.g., from one or more electrodes mounted on a flex circuit). In some examples, the force controller 614 can implement the force sensing, error metric tracking and/or coefficient learning processes of the disclosure. In some examples, the force controller 614 can be coupled to the touch controller 612 (e.g., via an I2C bus) such that the touch controller can configure the force controller 614 and receive the force information from the force controller 614. The force controller 614 can include the force processor and can also include other peripherals (not shown) such as random access memory (RAM) or other types of memory or storage. In some examples, the force controller 614 can be implemented as a single application specific integrated circuit (ASIC) including the force processor and peripherals, though in other examples, the force controller can be divided into separate circuits.

Touch controller 612 can include the touch processor and can also include peripherals (not shown) such as random access memory (RAM) or other types of memory or storage, watchdog timers and the like. Additionally, touch controller 612 can include circuitry to drive (e.g., analog or digital scan logic) and sense (e.g., sense channels) the touch sensor panel 602, which in some examples can be configurable based on the scan event to be executed (e.g., mutual capacitance row-column scan, row self-capacitance scan, stylus scan, pixelated self-capacitance scan, etc.). The touch controller 612 can also include one or more scan plans (e.g., stored in memory) that can define a sequence of scan events to be performed at the touch sensor panel 602. In one example, during a mutual capacitance scan, drive circuitry can be coupled to each of the drive lines on the touch sensor panel 602 to stimulate the drive lines, and the sense circuitry can be coupled to each of the sense lines on the touch sensor panel to detect changes in capacitance at the touch nodes. The drive circuitry can be configured to generate stimulation signals to stimulate the touch sensor panel one drive line at a time, or to generate multiple stimulation signals at various frequencies, amplitudes and/or phases that can be simultaneously applied to drive lines of touch sensor panel 602 (i.e., multi-stimulation scanning). In some examples, the touch controller 612 can be implemented as a single application specific integrated circuit (ASIC) including the touch processor, drive and sense circuitry, and peripherals, though in other examples, the touch controller can be divided into separate circuits. The touch controller 612 can also include a spectral analyzer to determine low noise frequencies for touch and stylus scanning. The spectral analyzer can perform spectral analysis on the scan results from an unstimulated touch sensor panel 602.

Host processor 616 can receive outputs (e.g., touch information) from touch controller 612 and can perform actions based on the outputs that can include, but are not limited to, moving one or more objects such as a cursor or pointer, scrolling or panning, adjusting control settings, opening a file or a document, viewing a menu, making a selection, executing instructions, operating a peripheral device coupled to the host device, answering a telephone call, placing a telephone call, terminating a telephone call, changing the volume or audio settings, storing information related to telephone communications such as addresses, frequently dialed numbers, received calls, missed calls, logging onto a computer or a computer network, permitting authorized individuals access to restricted areas of the computer or computer network, loading a user profile associated with a user's preferred arrangement of the computer desktop, permitting access to web content, launching a particular program, encrypting or decoding a message, or the like. Host processor 616 can receive outputs (e.g., force information) from force controller 614 and can perform actions based on the outputs that can include previewing the content of a user interface element on which the force has been provided, providing shortcuts into a user interface element on which the force has been provided, or the like. Host processor 616 can execute software or firmware implementing and synchronizing display functions and various touch, stylus and/ or force sensing functions. Host processor 616 can also perform additional functions that may not be related to touch sensor panel processing, and can be coupled to program storage and display 604 for providing a user interface (UI) to a user of the device. Display 604 together with touch sensor panel 602, when located partially or entirely under the touch sensor panel 602, can form a touch screen. The computing system 600 can process the outputs from the touch sensor panel 602 to perform actions based on detected touch or hover events and the displayed graphical user interface on the touch screen.

Computing system 600 can also include a display controller 618. The display controller 618 can include hardware to process one or more still images and/or one or more video sequences for display on display 604. The display controller 618 can be configured to generate read memory operations to read the data representing the frame/video sequence from a memory (not shown) through a memory controller (not shown), for example. The display controller 618 can be configured to perform various processing on the image data (e.g., still images, video sequences, etc.). In some examples, the display controller 618 can be configured to scale still images and to dither, scale and/or perform color space conversion on the frames of a video sequence. The display controller 618 can be configured to blend the still image frames and the video sequence frames to produce output frames for display. The display controller 618 can also be more generally referred to as a display pipe, display control unit, or display pipeline. The display control unit can be generally any hardware and/or firmware configured to prepare a frame for display from one or more sources (e.g., still images and/or video sequences). More particularly, the display controller 618 can be configured to retrieve source frames from one or more source buffers stored in memory, composite frames from the source buffers, and display the resulting frames on the display 604. Accordingly, display controller 618 can be configured to read one or more source buffers and composite the image data to generate the output frame.

In some examples, the display controller and host processor can be integrated into an ASIC, though in other examples, the host processor 616 and display controller 618 can be separate circuits coupled together. The display controller 618 can provide various control and data signals to the display, including timing signals (e.g., one or more clock signals) and/or vertical blanking period and horizontal blanking interval controls. The timing signals can include a pixel clock that can indicate transmission of a pixel. The data signals can include color signals (e.g., red, green, blue). The display controller 618 can control the display 604 in real-time, providing the data indicating the pixels to be displayed as the display is displaying the image indicated by the frame. The interface to such a display 604 can be, for example, a video graphics array (VGA) interface, a high definition multimedia interface (HDMI), a digital video interface (DVI), a LCD interface, a plasma interface, or any other suitable interface.

Note that one or more of the functions described above can be performed by firmware stored in memory and executed by the touch processor in touch controller 612, or stored in program storage and executed by host processor 616. The firmware can also be stored and/or transported within any non-transitory computer-readable storage medium for use by or in connection with an instruction execution system, apparatus, or device, such as a computer-based system, processor-containing system, or other system that can fetch the instructions from the instruction execution system, apparatus, or device and execute the instructions. In the context of this document, a "non-transitory computer-readable storage medium" can be any medium (excluding a signal) that can contain or store the program for use by or in connection with the instruction execution system, apparatus, or device. The non-transitory computer readable medium storage can include, but is not limited to, an electronic, magnetic, optical, electromagnetic, infrared, or semiconductor system, apparatus or device, a portable computer diskette (magnetic), a random access memory (RAM) (magnetic), a read-only memory (ROM) (magnetic), an erasable programmable read-only memory (EPROM) (magnetic), a portable optical disc such a CD, CD-R, CD-RW, DVD, DVD-R, or DVD-RW, or flash memory such as compact flash cards, secured digital cards, USB memory devices, memory sticks, and the like.

The firmware can also be propagated within any transport medium for use by or in connection with an instruction execution system, apparatus, or device, such as a computer-based system, processor-containing system, or other system that can fetch the instructions from the instruction execution system, apparatus, or device and execute the instructions. In the context of this document, a "transport medium" can be any medium that can communicate, propagate or transport the program for use by or in connection with the instruction execution system, apparatus, or device. The transport readable medium can include, but is not limited to, an electronic, magnetic, optical, electromagnetic or infrared wired or wireless propagation medium.

It is to be understood that the computing system 600 is not limited to the components and configuration of FIG. 6, but can include other or additional components in multiple configurations according to various examples. Additionally, the components of computing system 600 can be included within a single device, or can be distributed between multiple devices.

Therefore, according to the above, some examples of the disclosure are directed to an electronic device comprising: a lower surface; an upper surface; and a force sensing sealing structure situated between the lower surface and the upper surface, wherein the force sensing sealing structure comprises: a flexible cover material formed in a connected circumferential shape, the cover material enclosing a dielectric; a first conductive plate embedded in a first location of the cover material; and a second conductive plate embedded in a second location of the cover material; sense circuitry operatively coupled to the first conductive plate, the sense circuitry configured to sense a capacitance between the first conductive plate and the second conductive plate; and a processor configured to determine a magnitude of an applied force at the upper surface of the device based on the sensed capacitance. Additionally or alternatively, in some examples the second location is opposite of the first location; and the first conductive plate and the second conductive plate are horizontal with respect to the force sensing sealing structure. Additionally or alternatively, in some examples, the electronic device further comprises drive circuitry coupled to the second conductive plate, the drive circuitry configured to apply a drive signal to the second conductive plate. Additionally or alternatively, in some examples the first conductive plate and the second conductive plate are spaced a first distance from each other and have a first capacitance in the absence of the applied force; and the first conductive plate and the second conductive plate are spaced a second distance from each other and have a second capacitance in response to the applied force. Additionally or alternatively, in some examples the first conductive plate is one of a plurality of first conductive plates; the second conductive plate is one of a plurality of second conductive plates; and each first conductive plate corresponds to a second conductive plate as a pair of conductive plates, each pair of conductive plates at a unique location of the force sensing sealing structure. Additionally or alternatively, in some examples the processor is further configured to: sense a capacitance of each pair of conductive plates and determine a location of the applied force based on the sensed capacitances. Additionally or alternatively, in some examples the electronic device further comprises a touch screen configured for sensing a location of touch, wherein the processor is further configured to determine a location of the applied force based on the location of touch. Additionally or alternatively, in some examples an exterior of the flexible cover material is in direct contact with the lower surface and the upper surface. Additionally or alternatively, in some examples the lower surface or the upper surface comprises a channel and the force sensing sealing structure is situated in the channel. Additionally or alternatively, in some examples the upper surface comprises a cover material of the device.

Some examples of the disclosure relate to a force sensing sealing structure comprising: a flexible cover material formed in a connected circumferential shape, the cover material enclosing a dielectric; a first conductive plate embedded in a first location of the cover material; and a second conductive plate embedded in a second location of the cover material, wherein: the first conductive plate is operatively coupled to sense circuitry configured to sense a capacitance between the first conductive plate and the second conductive plate, the capacitance indicative of an applied force at the force sensing sealing structure. Additionally or alternatively, in some examples the dielectric is a non-structural compressible dielectric. Additionally or alternatively, in some examples the dielectric is air or silicone. Additionally or alternatively, in some examples the second location is opposite of the first location. Additionally or alternatively, in some examples the first conductive plate and the second conductive plate are horizontal with respect to the force sensing sealing structure. Additionally or alternatively, in some examples the second conductive plate is operatively coupled to drive circuitry, the drive circuitry configured to apply a drive signal to the second conductive plate. Additionally or alternatively, in some examples the first conductive plate and the second conductive plate are spaced a first distance from each other and have a first capacitance in the absence of the applied force; and the first conductive plate and the second conductive plate are spaced a second distance from each other and have a second capacitance in response to the applied force. Additionally or alternatively, in some examples the first conductive plate is one of a plurality of first conductive plates; the second conductive plate is one of a plurality of second conductive plates; and each first conductive plate corresponds to a second conductive plate as a pair of conductive plates, each pair of conductive plates at a unique location of the force sensing sealing structure. Additionally or alternatively, in some examples the first connection is one of a plurality of first connections; the second connection is one of a plurality of second connections; each first conductive plate is coupled to a first connection of the plurality of first connections; each second conductive plate is coupled to a second connection of the plurality of second connections.

Some examples of the disclosure relate to an electronic device comprising: a lower surface; an upper surface; and a force sensing sealing structure comprising: means for compressing under an applied force at the upper surface; and means for sensing a capacitance of the force sensing sealing structure, the capacitance indicative of the applied force at the upper surface, wherein the force sensing sealing structure is situated between the first surface and the second surface.

Although examples of this disclosure have been fully described with reference to the accompanying drawings, it is to be noted that various changes and modifications will become apparent to those skilled in the art. Such changes and modifications are to be understood as being included within the scope of examples of this disclosure as defined by the appended claims.

What is claimed is:

1. An electronic device comprising:
a lower surface;
an upper surface, the upper surface comprising a cover material that is parallel to a cover material plane; and
a force sensing sealing structure situated between the lower surface and the upper surface;
sense circuitry operatively coupled to the force sensing sealing structure, the sense circuitry configured to sense a capacitance of the force sensing sealing structure; and
a processor configured to determine a magnitude of an applied force at the upper surface of the device based on the sensed capacitance, wherein:
the lower surface comprises a channel and the force sensing sealing structure is situated in the channel,
the channel comprises a first channel surface and a second channel surface, the first channel surface and the second channel surface parallel to each other and perpendicular to the upper surface and the lower surface,
the first channel surface is at a location in the cover material plane that overlaps the cover material, and
the second channel surface is at a location in the cover material plane that does not overlap the cover material.

2. The electronic device of claim 1, wherein:
the channel comprises an inner channel surface and an outer channel surface in contact with the force sensing sealing structure, and
the inner channel surface comprises a gap, wherein the force sensing sealing structure is not in contact with the inner channel surface at a location of the gap.

3. The electronic device of claim 2, further comprising:
a routing trace that couples the force sensing sealing structure to the sense circuitry, wherein the routing trace is disposed within the gap of the inner channel surface.

4. The electronic device of claim 1, wherein:
the first channel surface is positioned around an outer perimeter of the force sensing sealing structure, and
the force sensing sealing structure is positioned around the second channel surface.

5. The electronic device of claim 1, further comprising:
a clamp in contact with the lower surface and the upper surface, the clamp configured to apply a nominal force to the upper surface and the lower surface to hold the upper surface and lower surface together around the force sensing sealing structure.

6. The electronic device of claim 5, wherein the clamp further comprises a spring that applies the nominal force to the upper surface and the lower surface.

7. The electronic device of claim 5, wherein the clamp is located inside of the electronic device.

8. The electronic device of claim 1, wherein the force sensing sealing structure comprises:
a flexible sensor cover material formed in a connected circumferential shape, the sensor cover material enclosing a dielectric;
a first conductive plate embedded in a first location of the sensor cover material; and a second conductive plate embedded in a second location of the sensor cover material.

9. The electronic device of claim 8, wherein:
the sense circuitry is coupled to the first conductive plate of the force sensing sealing structure, and
the capacitance of the force sensing sealing structure is a capacitance between the first conductive plate and the second conductive plate.

10. An electronic device comprising:
a lower surface;
an upper surface, the upper surface comprising a cover material that is parallel to a cover material plane; and
a force sensing sealing structure comprising:
a means for compressing under an applied force at the upper surface; and a means for sensing a capacitance of the force sensing sealing structure, the capacitance indicative of the applied force at the upper surface, wherein:
the force sensing sealing structure is situated between the upper surface and the lower surface, and
the lower surface comprises a channel and the force sensing sealing structure is situated in the channel,
the channel comprises a first channel surface and a second channel surface, the first channel surface and the second channel surface parallel to each other and perpendicular to the upper surface and the lower surface,
the first channel surface is at a location in the cover material plane that overlaps the cover material, and
the second channel surface is at a location in the cover material plane that does not overlap the cover material.

11. The electronic device of claim 10, wherein:
the channel comprises an inner channel surface and an outer channel surface in contact with the force sensing sealing structure, and
the inner channel surface comprises a gap, wherein the force sensing sealing structure is not in contact with the inner channel surface at a location of the gap.

12. The electronic device of claim 11, further comprising:
sense circuitry operatively coupled to the force sensing sealing structure, the sense circuitry configured to sense a capacitance of the force sensing sealing structure; and
a routing trace that couples the force sensing sealing structure to the sense circuitry, wherein the routing trace is disposed within the gap of the inner channel surface.

13. The electronic device of claim 10, wherein:
the first channel surface is positioned around an outer perimeter of the force sensing sealing structure, and
the force sensing sealing structure is positioned around the second channel surface.

14. The electronic device of claim 10, further comprising:
a clamp in contact with the lower surface and the upper surface, the clamp configured to apply a nominal force to the upper surface and the lower surface to hold the upper surface and lower surface together around the force sensing sealing structure.

15. The electronic device of claim 14, wherein the clamp further comprises a spring that applies the nominal force to the upper surface and the lower surface.

16. The electronic device of claim 14, wherein the clamp is located inside of the electronic device.

17. The electronic device of claim 10, wherein the means for compressing under an applied force at the upper surface comprises a flexible sensor cover material formed in a connected circumferential shape, the sensor cover material enclosing a dielectric.

18. The electronic device of claim 17, wherein the means for sensing a capacitance of the force sensing sealing structure comprises:
a first conductive plate embedded in a first location of the cover material; and
a second conductive plate embedded in a second location of the cover material.

* * * * *